Aug. 22, 1961
B. M. GORDON ET AL
2,997,704
SIGNAL CONVERSION APPARATUS
Filed Feb. 24, 1958
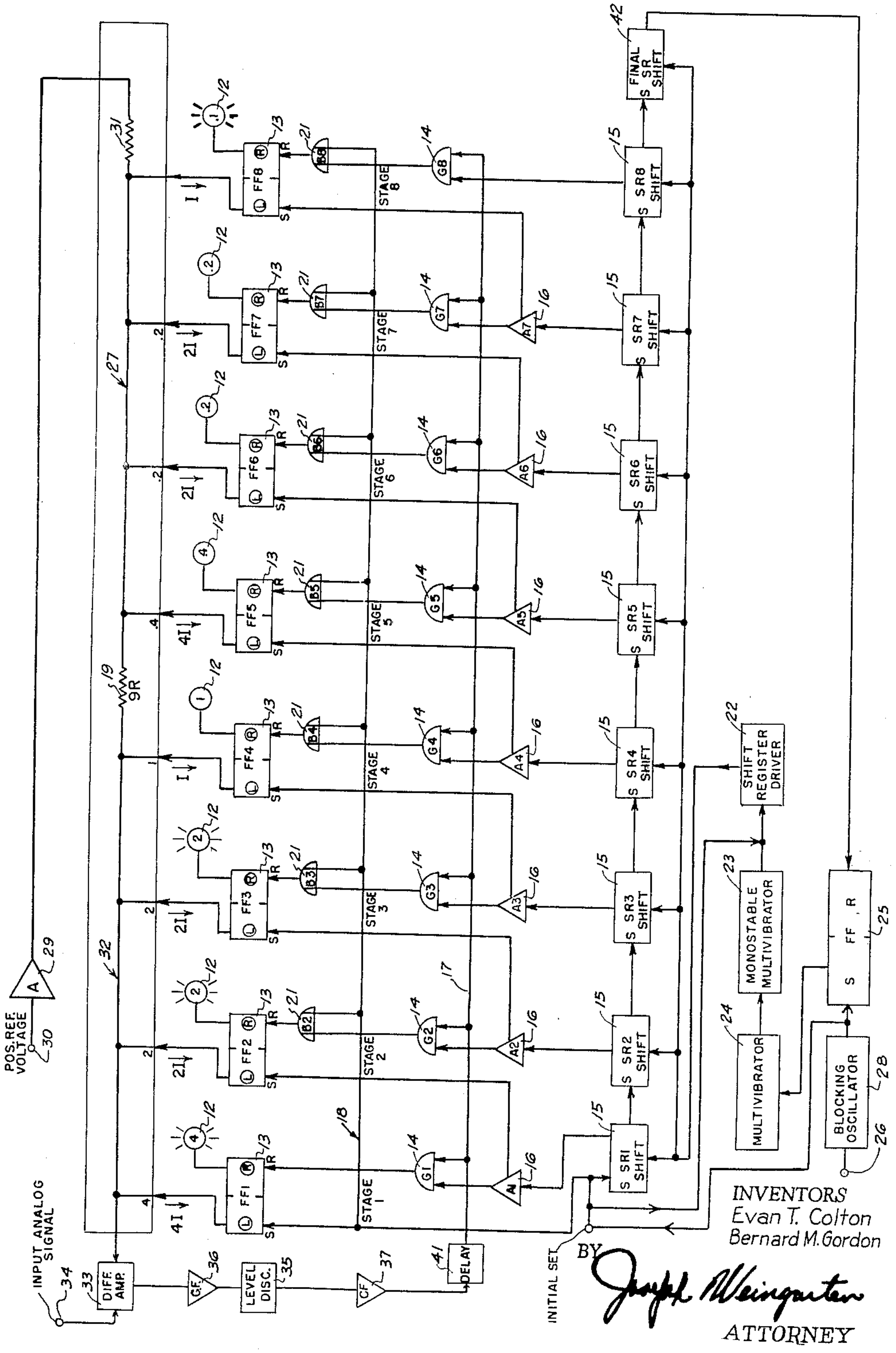
INVENTORS
Evan T. Colton
Bernard M. Gordon
BY Joseph Weingarten
ATTORNEY 2,997,704

SIGNAL CONVERSION APPARATUS

Bernard M. Gordon, Newton, and Evan T. Colton, Lynnfield Center, Mass., assignors to Epsco, Incorporated, Boston, Mass., a corporation of Massachusetts Filed Feb. 24, 1958, Ser. No. 717,175
8 Claims. (Cl. 340—347)

The present invention relates in general to information translating systems and more particularly concerns apparatus for transforming analog and digital data signals from one form to the other. Apparatus arranged according to the invention continuously provides a decoded analog signal indicative of a digital number. Alternatively, a digital output signal characteristic of sampled portions of an input analog signal is available at discrete intervals. Reliable operation is obtained with satisfactory accuracy utilizing a minimum number of conventional circuit components.

Several types of analog-to-digital converter systems are known in the art. In a counting type converter, the input analog signal controls the duration of a gating pulse. The duration of the gating pulse determines the number of regularly spaced pulses from a pulse source which energizes a conventional counter. After the gating pulse, the states of the counter stages are sensed to provide a digital output signal characteristic of the input analog signal. However, to accurately encode a wide amplitude range, the time interval between samples is too long to permit high sampling rates.

In a continuous type of converter, such as disclosed in a copending application of Bernard M. Gordon and Robert M. Talambiras entitled Information Translating Apparatus and Method, Serial No. 523,798, filed July 22, 1955, and assigned to the assignee of this application, a register stores a digital number which is decoded to provide a decoded analog signal. The decoded analog signal is compared with the input analog signal to provide a difference signal. The count in the register is then altered in the appropriate direction to minimize the difference signal. At any time, sensing the state of the stages in the register yields an indication of the digital equivalent for the input analog signal. This type of converter provides high speed accurate transformations of a single input analog signal. However, the time required to initially establish a count in the register closely corresponding to the proper value of the analog signal encoded is relatively large. Accordingly, this type of converter is generally not suitable for high speed multiplexing.

The present invention may be classified as a successive approximation converter. In this type of converter, each bit indicative of the digital number is determined in sequence, beginning with the one of greatest significance. A register is utilized to store the digital number indicative of the input analog signal. This register is initially set so that only the most significant bit is non-zero. A decoded analog signal is derived corresponding to this setting and compared with the input analog signal. If the input analog signal is larger than the decoded analog signal, the first bit remains unchanged and the decoded analog signal, characteristic thereof, continues. If the decoded analog signal is the larger, the first bit and the characterizing decoded analog signal are returned to zero. The second most significant bit is then made non-zero and a characterizing decoded analog signal derived therefrom. This signal is added to the first bit characterizing analog signal, if any, and the sum compared with the input analog signal. If the input analog signal is larger than this sum signal, the second bit stage and the characterizing decoded analog signal remain unchanged. If the sum is larger, the second bit stage and its characterizing decoded analog signal are returned to zero. In the same manner, the remaining bits of the digital number characteristic of the input analog signal are determined.

While prior art systems of this type have generally provided satisfactory operation, the programming scheme for effecting the required operation was relatively complex. If one of the command lines in the control circuits which effect the sequential determination of the bits is in the wrong condition during the program, due to noise or component failure, erroneous output signals are likely to be the result.

The present invention contemplates and has as a primary object the provision of successive approximation conversion apparatus capable of rapidly and accurately providing a digital output signal indicative of an analog input signal by employing relatively simple programming techniques instrumented with standard circuit components to minimize cost without sacrificing reliability.

Another object of the invention is to provide a novel digital word register cooperatively arranged with a decoding network whereby the number of resistors utilized in the latter is minimized.

It is another object of the invention to minimize the equipment required to respond to changes in the decoded analog signal relative to the input analog signal for making the appropriate correction in respective bit stages in the digital word register.

Still another object of the invention is to efficiently employ a shift register for controlling the sequential determination of the respective digital bits.

According to the invention, the digital word register comprises as many switching means as there are digital word bits. Each of the switching means may reside in either a set or reset state. The set and reset states correspond to the bit having nonzero and zero values, respectively. In the set state, a switching means directs a prescribed current into an impedance for contributing to a decoded analog signal derived across the impedance. The switching means are arranged consecutively to add progressively smaller contributions to the decoded analog signal. Means are provided for sequentially establishing the set state in the consecutively arranged switching means to provide respective progressively smaller steps in the decoded analog signal. A comparer is energized by the input and decoded analog signals and responds to the condition wherein a selected one of these analog signals is greater than the other by providing a gate conditioning signal, delayed relative to the immediately preceding one of the aforesaid steps by a predetermined time interval. Respective gating means are made permissive by the aforesaid gate conditioning signal for providing a reset output signal effective in returning the associated switching means to the reset state. Means responsive to the signal causing the establishment of the set state in one of said consecutively arranged switching means activates the gating means associated with the immediately preceding switching means to provide the reset output signal if the gating conditioning signal is then present, thereby returning that switching means to the reset state.

Other features, objects and advantages of the invention will become apparent from the following specification when read in connection with the accompanying drawing which illustrates a block diagram of an embodiment of the invention.

In the drawing, FF designates a flip-flop; B, a buffer; or OR gate; G, an AND gate; A an amplifier; CF, a cathode follower; and SR, a shift register stage. An accompanying numeral identifies the associated stage of the respective components. The encircled letters L and R denote flip-flop left and right sections, respectively. S and R denote set and reset inputs, respectively.

With reference now to the drawing, there is illustrated a block diagram of a system for obtaining a decimal number indicative of an input analog signal. Eight bit stages are used for representing a two-digit decimal number by the 4–2–2–1 system. Stages 1–4 are associated with the most significant digit; stages 5–8, with the digit of lesser significance. The decimal number is indicated by appropriately illuminated neon bulbs 12 associated with each bit stage. The weight given to each bulb when illuminated is indicated by the circled number. Thus, the decimal number 8.1 is indicated by illuminating the five bulbs 12 bearing the numerals 4, 2, 2, .1.

Before describing the mode of operation resulting in such indication, the arrangement of the system will be described. The first stage comprises a flip-flop 13 with the plate of its right section connected to a bulb 12 and the left section plate connected to a resistor 19 of value 9R. The output of gate 14 is connected to the reset input of flip-flop 13. One input of gate 14 is coupled to the output of shift register stage 15 through amplifier 16. The other input of gate 14 is connected to the gate conditioning potential line 17.

The remaining stages are arranged in a like manner with the exception that the output of gate 14 is coupled to the reset input of the associated flip-flop 13 through one input of a buffer 21. The other input of buffer 21 is connected to the reset line 18. Each following stage also differs from the first in that the set input of each shift register stage 15 after the first is coupled to the output of the preceding shift register stage.

The shift input of each shift register stage 15 is connected to the output of shift register driver 22. The output of monostable multivibrator 23 is connected to the input of shift register driver 22 and energized by the gated free running multivibrator 24. A conditioning potential is coupled to multivibrator 24 from flip-flop 25. The final shift register stage 42 has its output connected to flip-flop 25. The output of blocking oscillator 28 is coupled to the set input of flip-flop 25 and to initial reset line 18. Its input is connected to terminal 26.

The left sections of the flip-flops 13 in stages 4–8 are connected to a tenths digit junction 27 separating resistance 31 of value R from resistance 19. The other end of resistance 31 is connected through amplifier 29 to a source of reference potential on terminal 30. The units digit junction 32 accepts the currents from the first four stages and is connected to one input of differential amplifier 33. The other input to differential amplifier 33 is energized with the unknown analog signal applied on terminal 34. Differential amplifier 33 is coupled to level discriminator 35 through cathode follower 36. Another cathode follower 37 couples the output of level discriminator 35 to delay means 41, whose output is connected to gate conditioning potential line 17.

Operation is as follows: A conversion is initiated by either manually or automatically applying a signal to terminal 26, triggering blocking oscillator 28. The output signal therefrom sets flip-flop 25, flip-flop FF1 and shift register stage SR1. The remaining flip-flops 13 and shift register stages 15 are reset. The initial set signal coupled to the input of shift register driver 22 from initial set line 18 causes a shift pulse to be generated of sufficient duration to insure that all the stages 15, except the first, are in the second stable state. In the first stage SR1, the signal applied to the set input overrides the effect of the contemporaneously applied shift pulse and this stage is set to the first stable state.

When flip-flop 25 is set, free-running multivibrator 24 is activated, providing pulses which trigger monostable multivibrator 23. Multivibrator 23 responds by generating shift pulses of fixed duration. The shift pulses are amplified by shift register driver 22 and applied to the shift inputs of each shift register stage 15.

Thus, at the start of a conversion, the first shift register stage 15 is in the first stable state, and all the others reside in the second stable state. Additionally, the first stage flip-flop 13 was set. All other flip-flops were reset through the respective buffers 21. The left section of the first stage flip-flop FF1 is conducting, thereby drawing a current of 4I through resistors 19 and 31 to develop a decoded analog signal across the latter resistors characteristic of this bit being non-zero. At the same time, the right section of all flip-flops 13 except flip-flop FF1 are conducting. The output of the latter section is therefore high and the neon bulb 12 with the numeral 4 is then illuminated. This decoded analog signal causes a step rise or fall at the output of differential amplifier 33, depending on whether the decoded or input analog signal is the larger. If the decoded analog signal is larger, level discriminator 35 produces an output pulse which is coupled through cathode follower 37 through delay means 41. The output pulse therefrom, delayed by a period less than the interval between shift pulses, is utilized as a gate conditioning signal for application to line 17, thereby rendering all the gates 14 permissive. The significance of this signal is that the decoded analog signal corresponding to the presence of the most significant bit is greater than the contemporary value of the input analog signal. Accordingly, this bit should be returned to zero. This is accomplished when the next shift pulse returns the first shift register stage 15 from the first to the second stable state, thereby providing an output pulse which performs the following functions. First, it is coupled through the conditioned gate 14G1 to reset flip-flop 13 to the reset stage, thereby making the left and right sections respectively non-conducting and conducting whereby the neon bulb 12 illuminating the numeral 4 is extinguished. Second, an output pulse from the first stage amplifier 16 is applied to the set input of the second stage flip-flop 13, FF2 thereby setting it. When set, its conducting left section draws a current of 2I through resistors 14 and 31 to cause a corresponding step change in the decoded analog signal. Third, the output pulse from the first shift register stage 15 is utilized to set the second shift register stage 15 to the first stable state.

If the initially derived decoded analog signal was less than the contemporary value of the input analog signal, no output pulse is provided from level discriminator 35. Consequently, the gate conditioning potential is absent, and the gates 14 are unable to respond to an output pulse from the associated amplifier 16. This indicates that the most significant bit characteristic of the input analog signal should be non-zero. Accordingly, the first flip-flop 13 remains in the set condition with its associated neon indicating bulb illuminated.

When the second stage flip-flop is set, the step change in decoded analog signal is positive if the preceding stage remains set; otherwise, this step change is negative. In either case, there is a step in the output signal from differential amplifier 33 whose sense is dependent upon the relative magnitude of the contemporary values of input and decoded analog signal. Therefore, there is always available a step waveform for triggering a pulse response from level discriminator 35 when appropriate. These comparisons occur in sequence until all eight bits have been determined. After the eighth shift pulse, the final shift register stage 42 is in the first stable state. The next shift pulse causes an output pulse to be derived therefrom for resetting flip-flop 25 whereby multivibrator 24 is deactivated. The sum of the numerals then illuminated by bulbs 12 is the decimal equivalent of the input analog signal.

It should be observed that the potentials causing illumination of the neon bulbs 12 might condition respective two-legged gates. Energizing the other leg of each gate with a pulse from final shift register stage 42 would then effect parallel readout of each bit stage for operating a printer or for utilization in a digital computer.

Note that for each decimal digit, only one resistor is required in the decoding network. This is due to a novel choice of resistance values and current relations. The novel principles are applicable for obtaining conversion to digital numbers of any radix by approximately selecting currents and resistance values. The least significant bit stage associated with each digit draws the smallest current of value I through its associated digit junction. In the specific embodiment, these are FF4 and FF8 from units digit junction 32 and tenths digit junction 27, respectively. The remaining bit stages, depending upon the weighting of the respective bit, draw a current from the associated digit junction which is an integral multiple of the smallest current I. The ratio of the sum of all these bit currents to the smallest bit current is equal to one less than the radix of the digital number being represented. The number of different partial sums of the bit currents is also one less than the radix.

The resistances are serially connected between the digit junction associated with the digit of most significance and a reference potential terminal. The resistance between each digit junction and the reference terminal is equal to the radix times the total resistance between the digit junction of next smaller significance and the reference potential terminal.

These principles are applied in the representative embodiment shown in the drawing. The currents drawn by stages 4 and 8 are I; by stages 2, 3, 6, and 7, 2I; and by stages 1 and 5, 4I. The sum of the total currents drawn from each junction is 9I. The ratio of this total current to the smallest current I is 9, one less than the radix 10. There are nine different partial sums, 0, I, 2I, 3I, 4I, 5I, 6I, 7I and 8I. The total resistance between tenths digit junction 27 and the reference potential terminal at the output of amplifier 32 is R. The total resistance between units digit junction 32 and this reference potential terminal is 10R. The ratio of this total resistance to resistance 31 is 10, the radix of the digital number being encoded.

It is to be understood that higher speed operation may be obtained within the scope of the invention, digital numbers of different radix may be encoded, substantially continuous conversion may be accomplished, and different means for presenting the converted signals may be utilized within the scope of the invention. Numerous other modifications of and departures from the specific embodiment may be practiced by those skilled in the art without departing from the inventive concepts. Consequently, the invention is to be construed as limited only by the spirit and scope of the appended claims.

What is claimed is:

1. Apparatus for converting an input analog signal into a digital output signal comprising, a plurality of switching means each residing in either a set or reset state, impedance means, each of said switching means in the set state directing respective prescribed currents through said impedance means for contributing to a decoded analog signal derived across said impedance means, said switching means being arranged consecutively to add progressive contributions to said decoded analog signal, means for sequentially establishing said set state in said consecutively arranged switching means to provide respective steps in said decoded analog signal, means responsive to a condition wherein a selected one of said input and decoded analog signals is greater than the other for providing a gate conditioning potential delayed relative to the immediately preceding one of said steps by a predetermined time interval, respective gating means associated with each one of said switching means for providing a reset output signal for returning the associated switching means to said reset state, means for coupling said gate conditioning potential to all of said gates, and means responsive to the establishment of said set state in one of said consecutively arranged switching means for activating said gating means associated with the immediately preceding one of said switching means to provide said reset output signal and thereby return said immediately preceding switching means to said reset state only when said gate conditioning potential is present, said means for sequentially establishing said set state in said consecutively arranged switching means comprising, a shift register having a plurality of stages each having first and second stable states and each associated with a respective one of said switching means and a corresponding one of said gating means, means for initially establishing the first of said switching means in said set state, for establishing all others of said switching means in said reset state and for establishing only the first of said shift register stages in said first stable state, a source of shift pulses, means responsive to each shift pulse for reversing the stable states of that shift register stage then in said first stable state and the shift register stage immediately following, and means responsive to a shift register stage changing from said first to said second stable state for both energizing the gate associated with the shift register stage thus changing its stable state and for establishing the set state in the next consecutive one of said switching means, the gating means thus energized providing said reset output signal only when said gate conditioning signal is then present.

2. Apparatus for converting an input analog signal into a digital output signal comprising, a plurality of flip-flops each residing in either a set or reset state, resistive means, each of said flip-flops in the set state directing respective prescribed currents through said resistive means for contributing to a decoded analog signal derived thereacross, said flip-flops being arranged consecutively to add progressive contributions to said decoded analog voltage, respective gating means associated with each flip-flop for providing a reset output signal for returning the associated flip-flop to said reset state, respective shift register stages each having first and second stable states and associated with respective ones of said flip-flops and corresponding ones of said gating means, means for initially establishing the first of said flip-flops in said set state, for establishing all others of said flip-flops in said reset state and for establishing only the first of said shift register stages in said first stable state, a source of shift pulses, means responsive to each shift pulse for reversing the stable state of that shift register stage then in said first stable state and the shift register stage immediately following, means responsive to a shift register stage changing from said first to said second stable state for both energizing the gating means associated with the shift register stage thus changing its stable state and for establishing the set state in the next consecutive flip-flop, each flip-flop providing respective steps in said decoded analog signal as it changes to the set state, means responsive to a condition wherein a selected one of said input and decoded analog signals is greater than the other for providing a gate conditioning signal delayed relative to the preceding one of said steps by a predetermined time interval, means for coupling said gate conditioning potential to all of said gating means whereby said reset output signal is provided by that gate then energized by said means responsive to a shift register stage changing from said first to said second stable state, said gate conditioning signal being provided only in response to a condition wherein said decoded analog signal is greater than said input analog signal, said means responsive to said condition wherein said decoded analog signal being greater than said input analog signal for providing a gate conditioning signal delayed relative to the preceding one of said steps by a predetermined time interval comprises, a differential amplifier energized by said input analog signal and said decoded analog signal to provide a difference signal, a level discriminator response to said difference signal when the latter is indicative of the condition wherein said decoded analog signal is greater than said input analog signal to provide a stepped signal output, means for delaying said stepped signal output to provide said gate conditioning signal, a control flip-flop having on and off stable states, means responsive to said control flip-flop being in the on state for generating trigger pulses, a monostable multivibrator, means for coupling said trigger pulses to said monostable multivibrator to generate pulses of fixed duration, a shift register driver for providing said shift pulses, means for coupling said fixed duration pulses to the input of said shift register driver to provide said shift pulses, and means responsive to the last of said shift register stages changing from the first stable state to the second stable state for setting said control flip-flop in the off condition to terminate the generation of said trigger pulses.

3. Apparatus in accordance with claim 1 wherein said gate conditioning signal is provided only when said decoded analog signal is greater than said input analog signal.

4. Apparatus for converting an input analog signal into a digital output signal comprising, a plurality of flip-flops each residing in either a set or reset state, resistive means, each of said flip-flops in the set state directing respective prescribed currents through said resistive means for contributing to a decoded analog signal derived thereacross, said flip-flops being arranged consecutively to add progressive contributions to said decoded analog voltage, respective gating means associated with each flip-flop for providing a reset output signal for returning the associated flip-flop to said reset state, respective shift register stages each having first and second stable states and associated with respective ones of said flip-flops and corresponding ones of said gating means, means for initially establishing the first of said flip-flops in said set state, for establishing all others of said flip-flops in said reset state and for establishing only the first of said shift register stages in said first stable state, a source of shift pulses, means responsive to each shift pulse for reversing the stable state of that shift register stage then in said first stable state and the shift register stage immediately following, means responsive to a shift register stage changing from said first to said second stable state for both energizing the gating means associated with the shift register stage thus changing its stable state and for establishing the set state in the next consecutive flip-flop, each flip-flop providing respective steps in said decoded analog signal as it changes to the set state, means responsive to a condition wherein a selected one of said input and decoded analog signals is greater than the other for providing a gate conditioning signal delayed relative to the preceding one of said steps by a predetermined time interval, and means for coupling said gate conditioning potential to all of said gating means whereby said reset output signal is provided by that gate then energized by said means responsive to a shift register stage changing from said first to said second stable state.

5. Apparatus in accordance with claim 4 wherein said gate conditioning signal is provided only in response to a condition wherein said decoded analog signal is greater than said input analog signal.

6. Apparatus in accordance with claim 5 wherein said means responsive to said condition wherein said decoded analog signal is greater than said input analog signal for providing a gate conditioning signal delayed relative to the preceding one of said steps by a predetermined time interval comprises, a differential amplified energized by said input analog signal and said decoded analog signal to provide a difference signal, a level discriminator responsive to said difference signal when the latter is indicative of the condition wherein said decoded analog signal is greater than said input analog signal to provide a stepped signal output, and means for delaying said stepped signal output to provide said gate conditioning signal.

7. In a system for translating between an analog signal and a digital signal indicative of a number of prescribed radix and having a predetermined number of digits, apparatus comprising, digit junctions respectively associated with each of said digits, means associated with each digit junction for selectively applying thereto a plurality of currents at least two of which are different, each one of said currents being an integral multiple of the smallest thereof, the ratio of the sum of said currents to the smallest thereof being equal to one less than said radix, the number of different partial sums of said currents being one less than said radix, a reference terminal, a first resistance connected between said reference terminal and the digit junction associated with the least significant digit of said number, and respective resistances connected between digit junctions associated with digits of adjacent significance, the ratio of total resistance values between said reference terminal and digit junctions associated with digits of adjacent significance being equal to said radix.

8. Apparatus in accordance with claim 7 wherein said radix is ten and there are four of said currents associated with each of said digit junctions, the ratio of the largest to the smallest of said four currents being four, the ratio of each one of the other two of said four currents to said smallest current being two.

References Cited in the file of this patent

UNITED STATES PATENTS

| | | |
|---|---|---|
| 2,715,678 | Barney | Aug. 16, 1955 |
| 2,718,634 | Hansen | Sept. 20, 1955 |
| 2,754,503 | Forbes | July 10, 1956 |
| 2,762,038 | Lubkin | Sept. 4, 1956 |
| 2,784,396 | Kaiser | Mar. 5, 1957 |
| 2,827,233 | Johnson | Mar. 18, 1958 |
| 2,834,011 | Mork | May 6, 1958 |
| 2,839,740 | Haanstra | June 17, 1958 |
| 2,839,744 | Slocomb | June 17, 1958 |
| 2,858,434 | Tollefson | Oct. 28, 1958 |
| 2,869,115 | Doleman | Jan. 13, 1959 |
| 2,872,670 | Dickinson | Feb. 3, 1959 |

FOREIGN PATENTS

| | | |
|---|---|---|
| 157,970 | Australia | Apr. 28, 1952 |